Figure 1:
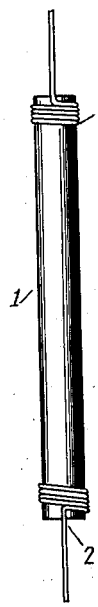

June 18, 1929.　　　S. LOEWE　　　1,717,712

RESISTOR AND METHOD OF MAKING SAME

Filed Jan. 17, 1927

INVENTOR
SIEGMUND LOEWE
BY Ira J. Adams
ATTORNEY

Patented June 18, 1929.

1,717,712

UNITED STATES PATENT OFFICE.

SIEGMUND LOEWE, OF BERLIN, FRIEDENAU, GERMANY, ASSIGNOR TO RADIO CORPORATION OF AMERICA, A CORPORATION OF DELAWARE.

RESISTOR AND METHOD OF MAKING SAME.

Application filed January 17, 1927, Serial No. 161,504, and in Germany February 13, 1926.

This invention relates to resistors and more particularly to resistors of such a type as are used, for example, for grid leaks, where a high stable resistance is desirable.

Special kinds of high-ohmic resistances were heretofore customarily made by applying a surface layer or film upon an insulating carrier or support, for example, by squirting or spraying thereon carbon- or graphite-containing solutions. Resistances so made, on account of the behavior of the carbon, were causative of manufacturing difficulties. Carbon being hygroscopic, undergoes alterations of its resistance value even during its manufacturing process. These changes which are due to changing absorption of moisture by the carbon cause resistors to be produced of varying ohmic value.

It is an object of this invention to provide a resistor whose resistance will remain constant.

The disadvantages residing in the use of sprayed carbon solutions can be avoided by employing solutions containing metal instead of carbon. Solutions of this sort may be the platinum and gold solutions known from the ceramic arts, the precious metal being separated therefrom upon increase of temperature.

According to the present invention, use is made of solutions of this kind in producing the desired resistance value. The solutions by spraying or division in the form of a fine mist are brought upon the bodies by deposition or precipitation, the latter being simultaneously or subsequently heated. Particularly suited for this purpose is Westhave's platinum solution. The latter can be used for atomization by the usual atomizers as well as for dividing the solution in the form of a fine mist. The difference between spraying and the latter procedure consists in that the latter is produced by submitting the solutions to a far higher pressure than the pressure employed for spraying. Indeed, by application of high pressure, the individual droplets become of such small size that they are capable of floating in the air. The same method is in vogue, for instance, in medicine for the purpose of atomizing liquids in such fine state of subdivision that they can be inhaled in the form of a mist.

In connection with the manufacture of high- and low-ohmic resistances, high-pressure atomization is particularly suited with the use of liquid solutions of precious metals. On account of the extreme minuteness of the droplets of liquid produced by high-pressure atomization, an extremely thin and uniform coat or film of the insulating supporting bodies provided with connecting terminals is produced. Resistances thus made, as regards their appearance, entirely resemble layers obtained by cathodic disintegration or spattering of metals.

Figure 2:
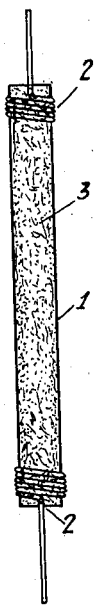

In the accompanying drawing I have shown in Figure 1, to an enlarged scale, a carrier before the deposition of the metallic liquid solution and, Figure 2 shows, also to an enlarged scale, a completed resistor after the deposition of the metallic resistance solution.

For further details, the method of making the resistors may be described in the following manner: A relatively large number of insulating resistance supports (see Figure 1), for instance, short glass sticks 1 having lead-ins 2 fastened at their ends are placed in highly heated state into a space in which the precious metal solution subjected to high-pressure atomization is located. According to the length of time for which the resistance supports are kept inside said space containing atomized metal, will a more or less thick film or metallic deposit of conducting properties be formed upon the stick.

The process can be applied also in inverse order in so far as the sticks 1 can be placed in the atomizing space in cold state and are then heated after a film of definite nature has formed thereon, the metal becoming incidentally separated. The heating may then be discontinued after the desired resistance value has been reached.

The method can also be used in combination with automatic apparatus adapted for surface spraying of insulating supports with precious metal solutions. In such an apparatus, the resistance supports are preferably arranged upon a rotating disk the said supports being periodically conveyed into another space in which they are heated. Later they are again brought for a short while through the spray or the atomizer space where another transient deposit is formed. Since in this method, small quantities of precipitation are alternately formed and separated by heating, it is an easy thing to insure definite and prescribed resistance values in a relatively large number of similarly formed resistance bodies by means of a large-scale manufacturing method. The resistances thus made are very insensitive to moisture and other agencies. Hence, they can be enclosed without the use of any other confinement in a vacuum where their permanent and invariable state is insured.

Instead of the said precious-metal solutions, of course, any other metallic solution made from base metals can be employed, provided they are suitable for the spray or high-pressure atomizing processes.

Having thus described my invention what I claim is:

1. The method of making a resistor having a high resistance of constant value which consists in heating a non-conductive carrier, subjecting a noble metal solution to a pressure sufficient to form a fine mist thereof, and directing said mist over the surface of said carrier whereby a thin, uniform film of said metal is deposited on said carrier.

2. A method of making a resistor having a high resistance of constant value which consists in heating a non-conductive carrier, subjecting a solution of a metal, non-oxidizable at high temperatures, to atomization, and directing the atomized solution over the surface of said carrier whereby a thin, uniform film of said metal is deposited on said carrier.

3. A method of making a resistor having a high resistance of constant value which consists in heating a non-conductive carrier, subjecting a platinum solution to a pressure sufficient to form a fine mist thereof, and directing said mist over the surface of said carrier whereby a thin, uniform film of platinum is deposited on said carrier.

SIEGMUND LOEWE.